United States Patent
Wigdahl

(10) Patent No.: US 6,272,821 B1
(45) Date of Patent: Aug. 14, 2001

(54) DEBRIS SEPARATOR FOR COTTON CONVEYING DUCT

(75) Inventor: Jeffrey Scott Wigdahl, Ames, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/533,639

(22) Filed: Mar. 22, 2000

(51) Int. Cl.⁷ .................................................. A01D 46/10
(52) U.S. Cl. .................................................. 56/30; 56/16.5
(58) Field of Search .................................. 56/28, 30, 32, 56/12.8, DIG. 8, 33, 34, 40, 41, 14.1, 14.2, DIG. 9, 16.5; 460/100, 117, 119

(56) References Cited

U.S. PATENT DOCUMENTS

| | | | |
|---|---|---|---|
| 4,390,376 | * 6/1983 | Rood, Jr. | 134/6 |
| 4,606,177 | 8/1986 | Schlueter | 56/30 |
| 5,311,728 | * 5/1994 | Schlueter | 56/33 |
| 5,394,679 | 3/1995 | Schlueter | 56/30 |
| 5,466,189 | * 11/1995 | Deutsch et al. | 460/100 |

FOREIGN PATENT DOCUMENTS

| | | | |
|---|---|---|---|
| 1576013 | * 7/1990 | (SU) | 56/30 |
| 1584811 | * 8/1990 | (SU) | 56/30 |

* cited by examiner

*Primary Examiner*—Robert E. Pezzuto

(57) ABSTRACT

A cotton harvester conveying system includes a cross auger with dual flighting that moves the material to a central location where four rapidly rotating paddles direct the material rearwardly into a separation duct. Heavier trash and debris settle towards the bottom of the auger, and the paddles propel the heavier material along a lower wall of the separation duct. The separation duct includes deflectors which intercept a lower portion of the rearwardly directed material. Heavy material loses momentum as it contacts the deflectors and drops out of the stream of conveyed material. Auger and paddle speed is maintained above approximately 750 rpm to break up clumps and provide efficient skimming action for removal of unwanted heavy material in the separation duct.

25 Claims, 3 Drawing Sheets

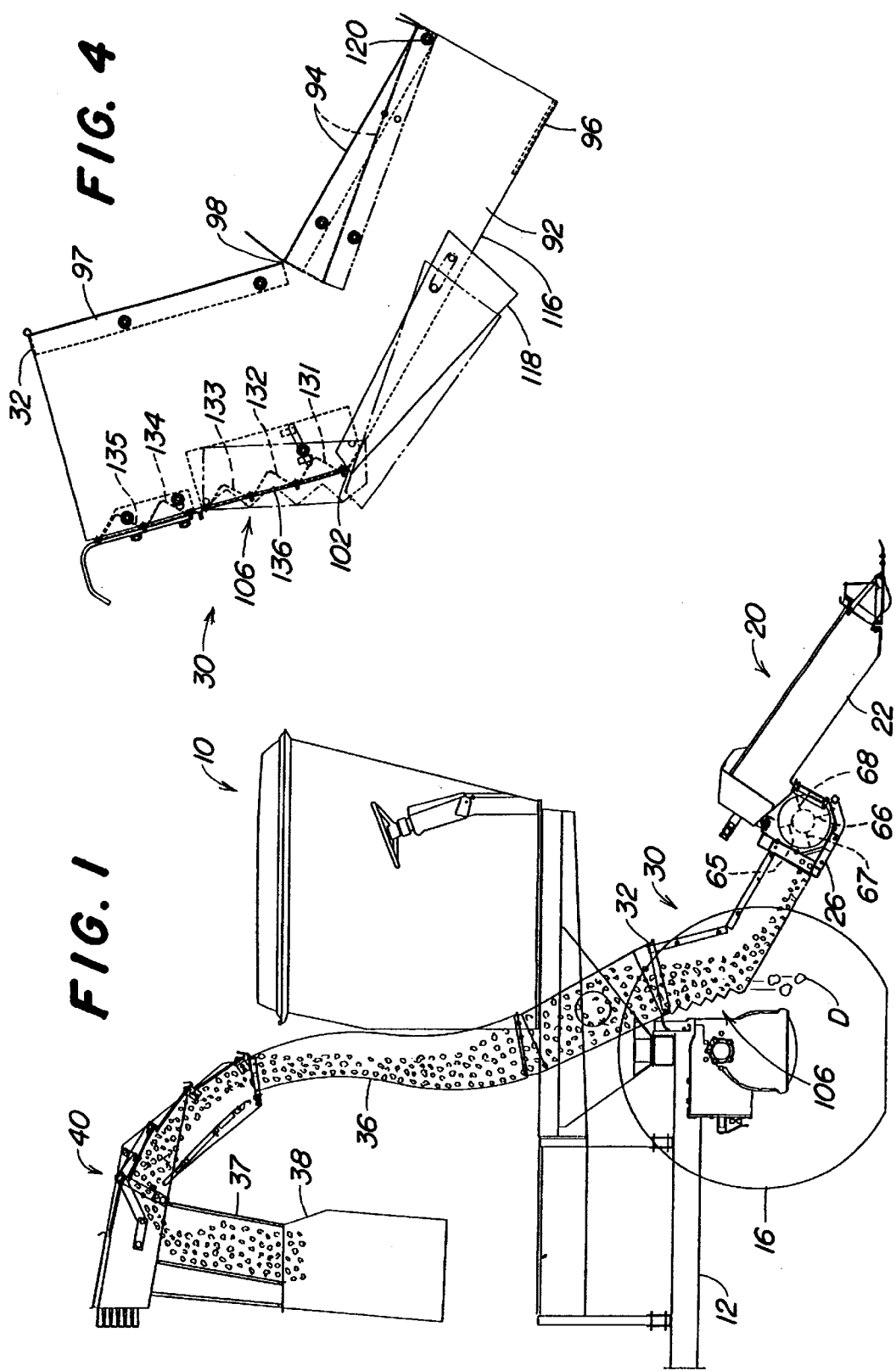

DEBRIS SEPARATOR FOR COTTON CONVEYING DUCT

BACKGROUND OF THE INVENTION

1) Field of the Invention

The present invention relates generally to agricultural implements and, more specifically, to a device for separating relatively heavy materials from a crop being conveyed through the air duct of a cotton harvester or similar implement.

2) Related Art

Harvesters such as cotton strippers include a conveying system with an air duct for moving material from stripping mechanisms upwardly and rearwardly toward a basket or cotton cleaner on the implement. The air stream carries green bolls and debris along with the desired cotton crop, and to remove some of the unwanted material, separators are typically incorporated into an area of the duct. Examples of such separators are shown in U.S. Pat. Nos. 4,606,177 and 5,394,679 assigned to Deere & Company. Heavy material such as rocks and green bolls tends to drop downwardly through an opening in the duct and out of the stream of material being conveyed to the basket or cleaner.

Although previously available separators have reduced the amount of trash reaching the basket or cleaner, a substantial amount of undesirable material often remains in the system. When a cleaner is employed on the implement, green bolls and debris foul the saws in the cleaner. Debris such as rocks and stumps can cause considerable damage to the internal components of the cleaner if they are not separated out properly. Increased trash content decreases the crop grade and results in a lower price for the crop. In high yield cotton, green bolls and debris often gets carried up with large clumps of cotton and therefore do not have an opportunity drop out of the material stream. In addition, the large clumps of material can cause blockages in the duct.

Clumping problems are increased as material directed rearwardly from the cross auger outlet is concentrated towards one side of the outlet and separation duct rather then being uniformly distributed across the width of the duct. Typically a pair of paddles offset 180 degrees from each other propel material rearwardly through the outlet. As the material is directed into the paddle area by the auger flighting, the initial contact between the paddles and the material typically directs excessive amounts of material rearwardly along the sides of the separation duct with less material near the center of the duct. Also, each paddle must move a relatively large amount of material from a full revolution of the associated auger flighting.

BRIEF SUMMARY OF THE INVENTION

It is therefore an object of the present invention to provide an improved trash separator for an implement such as a cotton harvester. It is another object to provide such a separator which removes substantially more trash than most previously available separators.

It is a further object to provide an improved trash separator for a cotton harvester duct which is simple and inexpensive in construction and which separates green bolls and other trash more efficiently and effectively than at least most other prior art separator devices. It is a further object to provide such a separator which operates effectively, even in very high yield cotton, and which reduces problems caused by clumping of material.

It is a further object to provide an improved trash separator for a cotton conveying duct which is adjustable to vary the degree of separating aggressiveness and optimize selectivity of undesired material. It is a further object to provide such a separator which operates primarily on trash and green bolls and enhances flow of desirable crop material.

It is another object to provide an improved auger system for a cotton harvester. It is another object to provide such a system having an improved flighting and paddle structure. It is still another object to provide such a system in combination with a trash separator having increased selectivity and increased anti-clumping features.

A cotton harvester conveying system includes trash separating structure for removing heavy debris from a stream of harvested material. A cross auger with dual flighting moves the material to a central location where four rapidly rotating paddles direct the material rearwardly into a separation duct. Heavier trash and debris settle towards the bottom of the auger, and the paddles propel the heavier material along a lower wall of the separation duct. A wall of the separation duct includes a series of deflectors which intercept a lower portion of the rearwardly directed material so the heavy material loses momentum as it contacts the deflectors. The heavy material then drops out of the stream of conveyed material while the lighter material continues to move upwardly towards a basket or cleaner. A substantially higher percentage of unwanted heavy material is effectively removed from the stream to decrease cleaner damage and increase cotton grade. The auger and paddle structure provides improved distribution of the material in the separation duct and breaks up clumps that could otherwise cause blockages.

These and other objects, features and advantages of the present invention will become apparent to one skilled in the art upon reading the following detailed description in view of the drawings.

BRIEF DESCRIPTION OF THE DRAWINGS

FIG. 1 is a side view of the front portion of a cotton harvester with a cotton cleaner and including an improved trash separator on the lower portion of a cotton conveying duct.

FIG. 4 is an enlarged side view of the separation duct area of the duct structure.

DETAILED DESCRIPTION OF THE DRAWINGS

Figure 3:
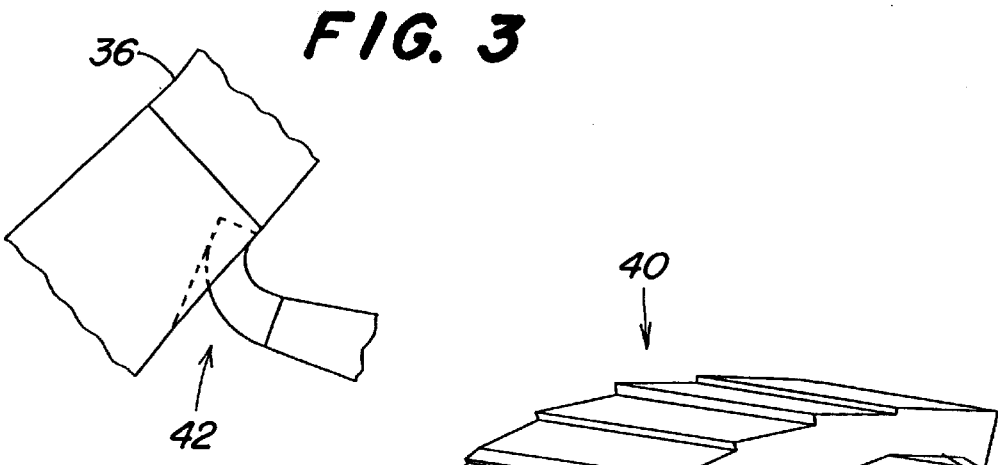
FIG. 3 is a view taken generally along lines 3—3 of FIG. 2.
Figure 2:
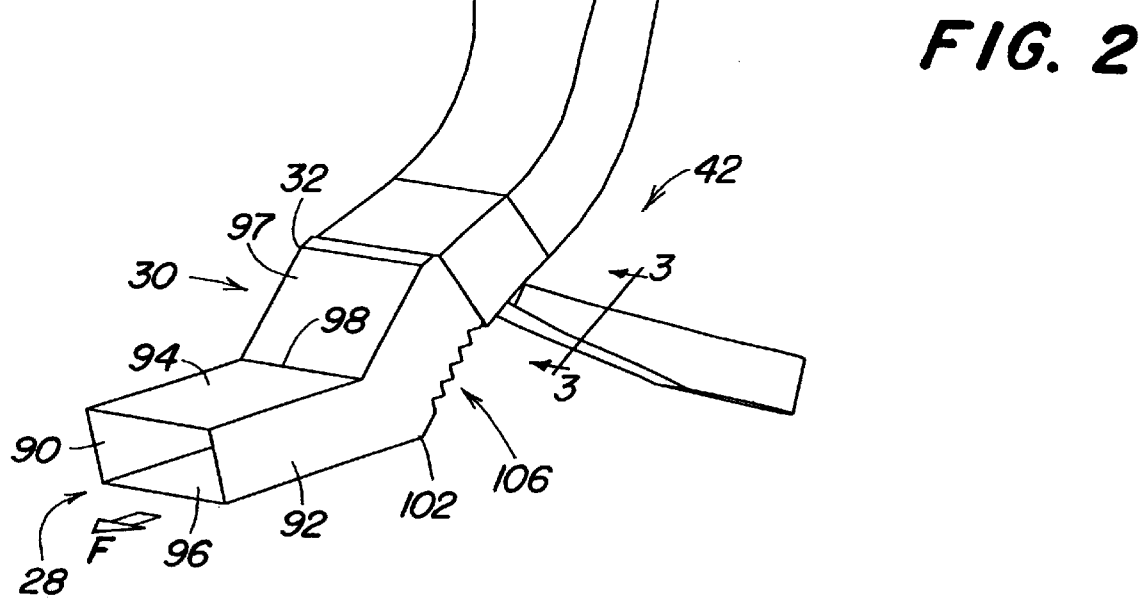
FIG. 2 is an enlarged front perspective view of the duct structure of the harvester of FIG. 1.

Referring now to FIG. 1, therein is shown a harvester such as a cotton stripper 10 having a frame 12 supported for movement over a field by forward drive wheels 16 and rear steerable wheels (not shown). Row units 20 mounted at the forward end of the frame 12 receive rows of cotton plants and include conventional counter-rotating stripper rolls (not shown) which remove cotton along with other plant material from the rows and fore-and-aft conveying augers 22 which move the material rearwardly to a cross auger 26. The cross auger 26 opens at a central or outlet location 28 in a rearward direction into separation duct structure 30. Alternatively, a finger type of stripping header may also be utilized in place of the row units 20.

The separation duct structure 30 has an upper end 32 connected to the lower end of a central air duct 36. The central duct 36 extends rearwardly and upwardly towards a cleaner input duct 37 and cleaner 38 via adjustable grate structure 40. A conventional air nozzle 42 at the rear of the lower duct portion (or intermediate duct) of the duct 36 directs air upwardly into the duct 36 to draw material upwardly through the separation duct structure 30 and propel it through the upper portion (or chimney duct) of the duct 36 towards the grate structure 40.

Figure 5:
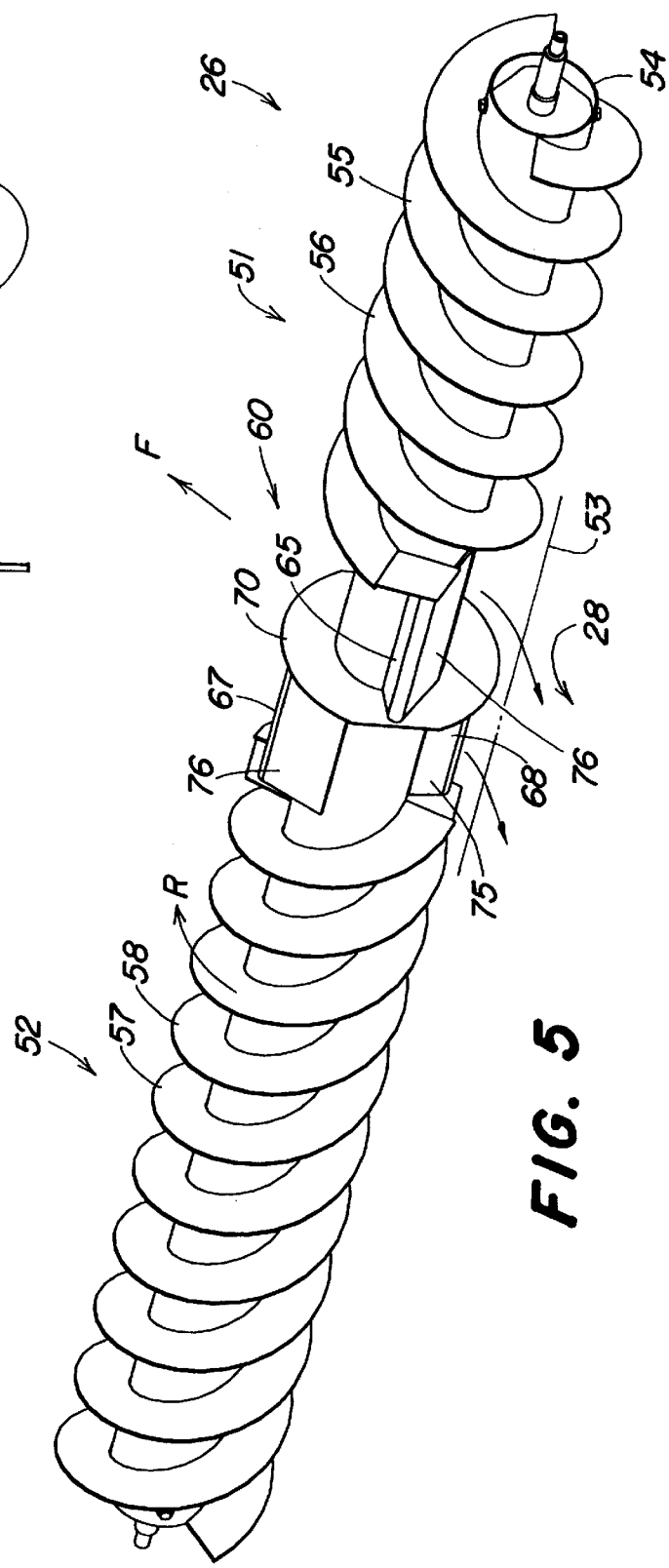
FIG. 5 is a rear perspective view of the auger and paddle structure of the cross auger on the harvester of FIG. 1.

The cross auger 26 (FIGS. 1 and 5) includes two sets of flighting 51 and 52 supported for rotation in an auger trough 53 by transversely extending tube structure 54. The set 51 includes flights 55 and 56 which move material inwardly from the right side of the harvester 10 (as viewed in the forward direction of travel F), and the set 52 includes flights 57 and 58 which move material inwardly from the left side of the machine. The flighting converges to the central location 28 and terminates at a central area 60 having a width approximately equal to the width of the separation duct at the outlet location 28. Four paddles 65, 66, 67 and 68 extend transversely from the ends of the respective flighting 55, 56, 57 and 58 to a connection with central divider disk 70. The paddles are offset 90 degrees from each other around the periphery of the tube structure 54 and each has a width equal to approximately half the width of the input to the separation duct 30.

Figure 6:
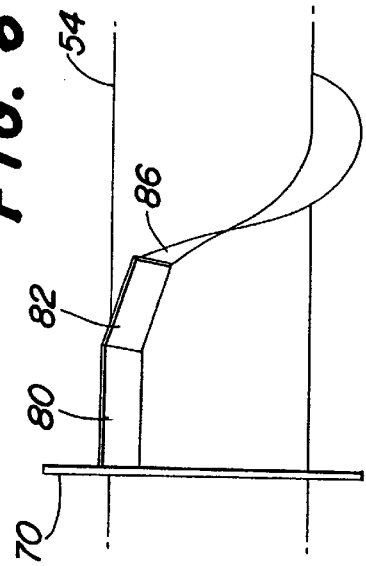
FIG. 6 is a view of the area of the auger and paddle structure where an auger flighting connects with the paddle showing an alternate embodiment for improved distribution across the width of the paddles.

The paddles 65 and 66 on one side of the disk 70 are offset 180 degrees from each other, with the paddles 67 and 68 on the opposite side of the disk also offset 180 degrees from each other. The paddles 67, 68 are 90 degrees out of phase with respect to the paddles 65, 66. Each of the paddles includes a forward face 75 extending radially from the tube 54 and presenting an impelling surface in the direction of rotation (R of FIG. 5). The face 75 extends generally to the circumference of the flighting. A rear planar panel 76 extends from the outermost portion of the paddle back to a tangential connection with the periphery of the tube structure 54 for support of the face 75 and for elimination of a potential source of material build-up behind the paddle. In an alternate embodiment shown in FIG. 6, a paddle 80 is connected by a connecting portion 82 to an inner end 84 of the associated flighting 86. The connecting portion is angled relative to the face 75 and provides some transverse conveying in combination with less aggressive propelling action near the side of the separation duct structure 30 so more of the material moves towards the disk 70 before being directed rearwardly. Therefore, the material tends to spread more uniformly across the face 75 and the width of the duct structure 30 for more efficient conveying and separation action.

The paddle construction in combination with the double flighting on each side of the disk 70 assures a more continuous, uniform flow of material, particularly in heavy cotton, from the row units to the central location across the width of the separation duct 30 and reduces clumping. The auger may be rotated at the conventional speed of 650 rpm but preferably is rotated at a substantially greater speed in a range of between approximately 750 to 1000 rpm. The high speed auger operation and the separation duct structure 30 provide a skimming effect, described in further detail below, for undesirably heavy materials that tend to gravitate towards the bottom of the auger trough.

The separation duct structure 30 includes sidewalls 90 and 92 connecting top and bottom walls 94 and 96 and extending rearwardly from the outlet location 28 to receive material propelled rearwardly from the central area 60 of the cross auger 26. A rear portion 97 of the top wall 94 angles upwardly at bend location 98 and extends to the upper end 32 where the separation duct is slidably received within the lower portion of the duct 36. The bottom wall 96 extends rearwardly about four to six inches (10 to 15 cm.) towards a bend location 102. A deflector panel or wall 106 extends upwardly and rearwardly from the location 102 to the upper end 32. The bottom wall 96 is apertured at 116 to define a debris receiving area or outlet which also provides a source of air for induced air flow below the nozzle 42. An adjustable door 118 varies the size of the outlet. As shown in FIG. 4, the upper wall 94 is pivotally connected at location 120 to the duct and is adjustable to facilitate control of the direction of material flowing towards the deflector wall 106 and eliminate a direct upward path to the nozzle area. Alternatively, the upper wall 94 can be fixed at a preselected angle to provide the desired control.

The deflector wall 106 includes a plurality of offset surfaces 131, 132, 133, 134 and 135 generally located along the back wall and facing the open area 116. The surfaces 121–133, as shown in FIG. 4, are connected to a panel 136 which may be pivoted to vary the location and angle of the surfaces relative to the stream of impinging material. If desired, the panel 136 may be fixed in a preselected location. As unwanted heavy debris (see D of FIG. 1) is propelled rearwardly it tends to move along the lower wall 96 and contact one or more of the surfaces 131–135 which reduces the rearward and upward velocity of the unwanted debris. The heavy debris, having lost momentum, falls under the influence of gravity through the outlet at 116, while the lighter crop material is conveyed upwardly towards the grate structure 40.

The heavy debris tends to settle in the lower portion of the auger 26, and the action of the paddles 65–68 propels such material along the lower portion of the separating duct 30. The heavy material then contacts the surfaces, loses momentum and falls through the outlet at 116. The auger and paddle arrangement and the deflector panel act as a skimmer to remove material that has potential to damage or foul components of the cleaner 38. Preferably, the offset surfaces of the deflector wall 96 form short steps on the order of two inches (5 cm.) in depth to avoid deep corners where cotton can gather.

Having described the preferred embodiment, it will become apparent that various modifications can be made without departing from the scope of the invention as defined in the accompanying claims.

What is claimed is:

1. In a harvester adapted for forward movement over the ground for removing cotton from plants and directing the cotton rearwardly in a path, wherein unwanted material including green bolls, plant material and debris are also moved rearwardly along the path, the harvester including a conveyor duct having forward and aft wall structure connected by sidewalls and a lower end for receiving the rearwardly directed cotton, an air system connected to the duct for propelling the removed crop upwardly to a crop receiving device, separating structure for separating the unwanted material from the cotton, the separating structure comprising:

a debris receiving area located at the lower end of the duct;

the aft wall structure including a deflector located above the debris receiving area in the path of the rearwardly directed unwanted material, the deflector including a surface angled with respect to the panel towards the opening, wherein the unwanted material impinges on the surface and is directed downwardly to the debris receiving area.

2. The separating structure as set forth in claim 1 wherein the deflector comprises a plurality of offset surfaces decreasing momentum of unwanted material.

3. The separating structure as set forth in claim 1 wherein the deflector is adjustable relative to the panel to vary aggressiveness of the separating structure.

4. The separating structure as set forth in claim 1 further comprising an auger and rotating kicker paddles directing the removed cotton and unwanted materials rearwardly from the auger along the path, wherein the kicker paddles are rotated at a speed in a range of approximately 650 to 1000 rpm.

5. The separating structure as set forth in claim 4 wherein the auger comprises at least four kicker panels.

6. The separating structure as set forth in claim 4 wherein the auger comprises an auger housing having a lower portion, the unwanted material tending to gravitate towards the lower portion prior to being directed rearwardly by the kicker panels so the unwanted material tends to be offset vertically from the removed crop, and wherein the unwanted materials impinge the deflector surfaces and are skimmed from the removed crop which is directed upwardly.

7. The separating structure as set forth in claim 1 further comprising an adjustable door defining the opening at the lower end of the duct.

8. The separating structure as set forth in claim 7 wherein the deflector is adjustable to vary separating and conveying characteristics of the removed crop and unwanted material in the duct.

9. The invention as set forth in claim 1 including an adjustable panel located adjacent the forward wall structure opposite the deflector for adjustably directing material towards the deflector.

10. The invention as set forth in claim 1 including paddle structure rotatably mounted adjacent the lower end of the duct and directing unwanted material towards the deflector, the paddle structure rotatable at a speed greater than approximately 750 rpm.

11. In a cotton harvester adapted for forward movement over the ground and including a stripping unit for removing cotton from plants and auger structure for conveying the removed cotton and unwanted material such as green cotton bolls and field debris from the stripping unit, the harvester including a conveying duct having walls and a lower end receiving the cotton and material from the conveyor and an air system for propelling the cotton upwardly and rearwardly in the duct and propelling the unwanted material along a path, separating structure for separating the unwanted material from the cotton, the separating structure comprising:

a deflector located adjacent a wall of the duct in the path of the unwanted material;

trash receiving area in the duct offset from the deflector; and wherein the deflector includes at least two offset surfaces, the surfaces angled with respect to the path to reduce the momentum of the unwanted material and facilitate movement of the unwanted material out of the path and to the trash receiving area.

12. The separating structure as set forth in claim 11 wherein the deflector comprises a plurality of spaced deflector surfaces generally facing the trash receiving area.

13. The separating structure as set forth in claim 11 wherein the deflector includes a plurality of angle members each having a first face defining one of the offset surfaces.

14. The separating structure as set forth in claim 11 including adjusting structure connecting the deflector to the duct and facilitating adjustment of the deflector relative to the path to vary aggressiveness of the separating structure.

15. The separating structure as set forth in claim 11 including an adjustable wall member offset vertically from the path for adjusting the flow of material along the path upstream of the deflector.

16. The separating structure as set forth in claim 11 further comprising rotating paddle members located upstream of the deflector and propelling unwanted material towards the deflector.

17. The separating structure as set forth in claim 16 including a rotatable cross auger, wherein the rotating paddle members are located on the cross auger, and wherein the paddle members are rotated at a speed of between approximately 750 and 1000 rpm and cooperate with the deflector to provide a skimming effect for heavy unwanted materials.

18. The separating structure as set forth in claim 16 wherein the cross auger comprises two sets of double flighting defining four flighting ends adjacent the separating structure, and further including paddle structure connected to the flighting ends.

19. The separating structure as set forth in claim 16 including a rotatable cross auger with flighting, the flighting having an end portion, a paddle having a preselected width and rotatable with the cross auger for directing material from the flighting towards the deflector, and a member connected between the paddle and the end portion of the flighting for spreading material across the width of the paddle.

20. The separating structure as set forth in claim 19 wherein the paddle is rotated at a speed substantially greater than 650 rpm.

21. In a cotton harvester adapted for forward movement over the ground and including transversely spaced stripping units for removing cotton from plants and unwanted material such as green cotton bolls and field debris, separating structure comprising:

a transversely extending auger having flighting for conveying removed cotton and unwanted material to a central location;

a separation duct extending from the conveyor at the central location;

a plurality of paddles mounted for rotation at the central location and directing cotton and unwanted material into the separation duct along a path; and a deflector located in the separation duct in the path and including a surface angled relative to the path to facilitate reducing the momentum of the unwanted material so the unwanted material drops from the path.

22. The separating structure as set forth in claim 21 wherein at least two paddles are connected for rotation with the auger.

23. The separating structure as set forth in claim 21 wherein the auger includes four paddles and two sets of double flighting defining four end portions adjacent the central location, each end portion connected to one of the paddles.

24. The separating structure as set forth in claim 21 wherein the paddles comprise transversely extending panels of preselected widths and the auger includes end portions with an angled connecting portion facilitating spreading of the cotton and unwanted material generally across the widths of the panels.

25. The separating structure as set forth in claim 22 wherein the auger and paddles are rotated at a speed of between 650 and 1000 rpm.

* * * * *